US005620406A

United States Patent [19]
Bae

[11] Patent Number: 5,620,406
[45] Date of Patent: Apr. 15, 1997

[54] TOOL CLAMPING MECHANISM

[75] Inventor: Mansu Bae, Kyungju-kun, Rep. of Korea

[73] Assignee: Hyundai Motor Company, Rep. of Korea

[21] Appl. No.: 535,512

[22] Filed: Sep. 28, 1995

[30] Foreign Application Priority Data

Sep. 29, 1994 [KR] Rep. of Korea ............. 94-24821

[51] Int. Cl.⁶ .................................................. B65F 47/90
[52] U.S. Cl. ............................ 483/39; 483/38; 483/902; 294/87.24; 294/115; 414/736
[58] Field of Search .................... 483/38, 39, 40, 483/902, 42, 43, 44, 45, 46; 294/87.2, 87.22, 87.24, 86.4, 115, 116; 414/736

[56] References Cited

U.S. PATENT DOCUMENTS

| 4,072,236 | 2/1978 | Nomura et al. ............ 483/902 |
| 4,091,526 | 5/1978 | Nakaso et al. ............ 483/902 |
| 4,457,659 | 7/1984 | Watanabe ................. 483/902 |
| 4,833,772 | 5/1989 | Kobayashi et al. ......... 483/44 |
| 4,884,332 | 12/1989 | Ozawa et al. ............. 483/902 |
| 5,081,762 | 1/1992 | Kin ...................... 483/902 |
| 5,277,689 | 1/1994 | Ruetschle et al. ......... 483/902 |

FOREIGN PATENT DOCUMENTS 267941A  5/1989  Germany ................. 483/43

Primary Examiner—M. Rachuba
Assistant Examiner—Christopher Kirkman
Attorney, Agent, or Firm—Finnegan, Henderson, Farabow, Garrett & Dunner, L.L.P.

[57] ABSTRACT

Disclosed is a tool clamping mechanism for use in a machining center, which includes a pivoting member having at opposite ends a pair of fingers for grasping a tool, the pair of fingers being connected by means of a hinge, a rotating block fixedly mounted on a shaft so as to be rotated clockwise and counter-clockwise in a given range by the shaft, the rotating block being rotatably positioned in the center of the pivoting member, a pair of sliders for respectively pushing and pulling the pairs of fingers to open or close, a pair of rotating block links for respectively connecting the rotating block with the pair of sliders, a pair of slider links for connecting each of the sliders with each pair of fingers, and an actuating means for rotating the shaft and thus rotating block, wherein the rotating block is rotated to push or pull the pair of sliders so as to open or close the pairs of fingers through the cooperation of the links.

3 Claims, 7 Drawing Sheets

ND: 5,620,406

TOOL CLAMPING MECHANISM

BACKGROUND OF THE INVENTION

(1) Field of the Invention

The present invention concerns a tool clamping mechanism for clamping a tool in a machining center.

(2) Description of the Prior Art

Generally, a numerically controlled machine tool includes a machining center with a tool change apparatus. Such machining center is classified as vertical or horizontal type according to spindle direction. The tool change apparatus is designed to rotate when changing the tools. The tool clamping mechanism mounted on the tool change apparatus for grasping a tool to remove it from a storage magazine or spindle, and for solidly holding the tool as it is carried therebetween. Such tool clamping mechanism is disclosed in U.S. Pat. No. 4,845,834.

Typically, the tool clamping mechanism comprises a pair of fingers for grasping tools, and actuating means for actuating the fingers.

SUMMARY OF THE INVENTION

It is an object of the present invention to provide a tool clamping mechanism mounted on a tool change apparatus for solidly grasping a tool.

According to an embodiment of the present invention, a tool clamping mechanism for use in a machining center comprises:

- a pivoting member having at opposite ends a pair of fingers for grasping a tool, the pair of fingers being connected by means of a hinge;
- a rotating block fixedly mounted on a shaft so as to be rotated clockwise and counter-clockwise in a given range by the shaft, the rotating block being rotatably positioned in the center of the pivoting member;
- a pair of sliders for respectively pushing and pulling the pairs of fingers to open or close;
- a pair of rotating block links for respectively connecting the rotating block with the pair of sliders;
- a pair of slider links for connecting each of the sliders with each pair of fingers; and
- an actuating means for rotating the shaft and thus rotating block, wherein the rotating block is rotated to push or pull the pair of sliders so as to open or close the pairs of fingers through the cooperation of the links.

The present invention will now be described with reference to the drawings attached only by way of example.

DETAILED DESCRIPTION OF THE PREFERRED EMBODIMENTS

Figure 1:
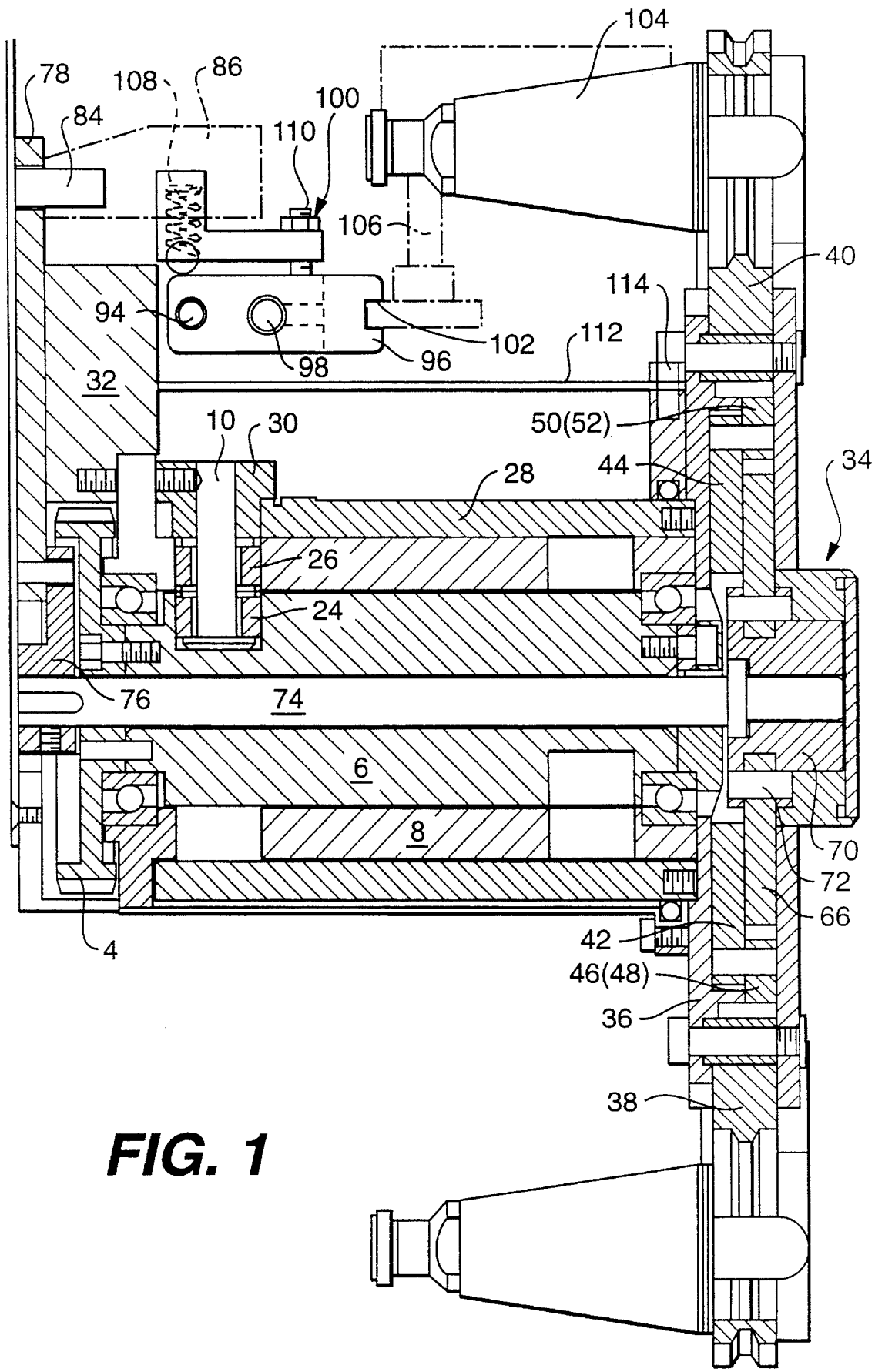
FIG. 1 is a side cross sectional view for schematically illustrating a tool change apparatus for changing the tools of a machining center according to an embodiment of the present invention.
Figure 3:
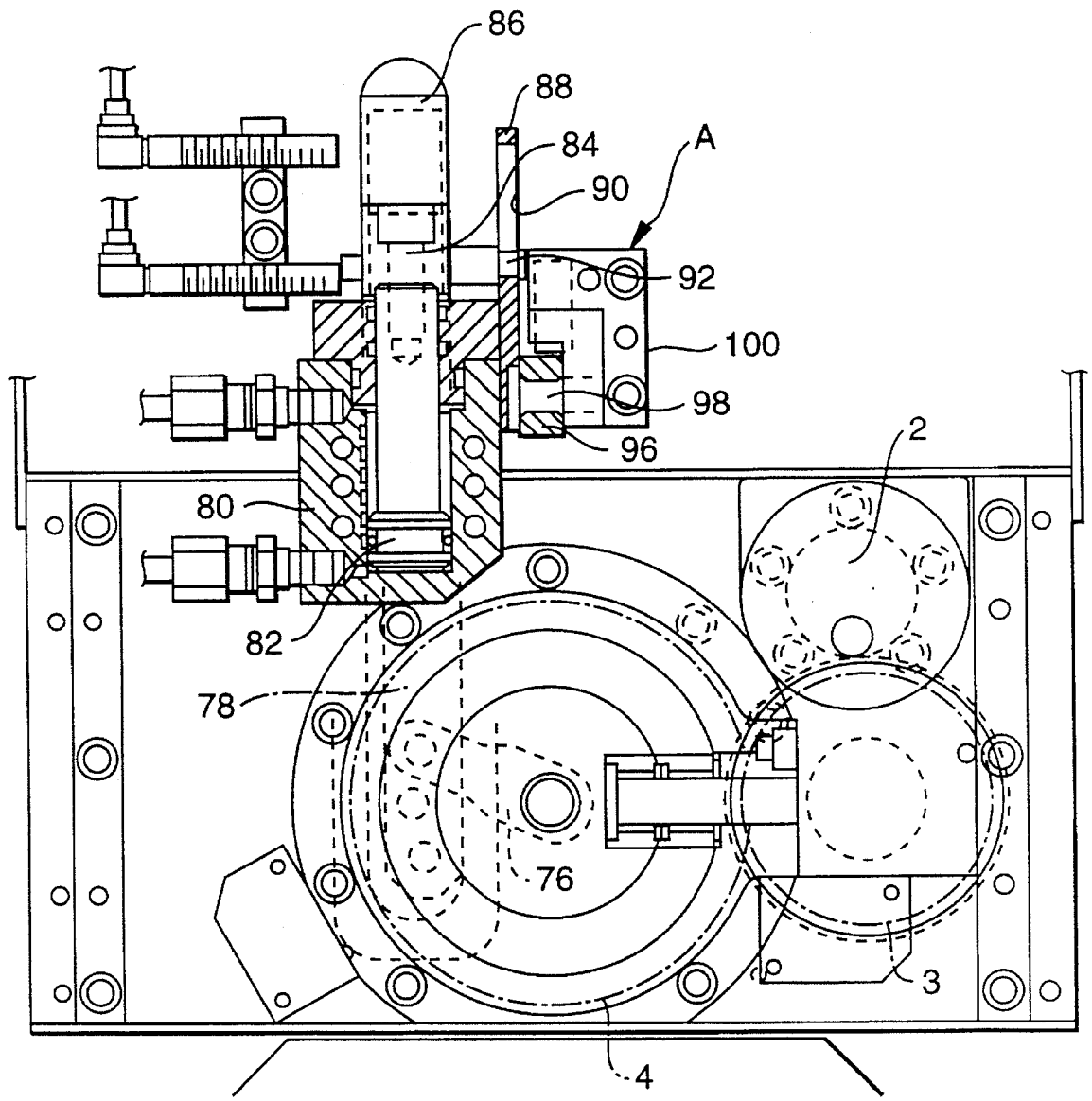
FIG. 3 is a partially cross-sectioned view for illustrating an actuating means for actuating a tool clamping mechanism according to an embodiment of the present invention.

Referring to FIGS. 1 and 3, a tool change apparatus for changing the tools of a machining center comprises a frame 32 for mounting the tool change apparatus, a tool clamping mechanism 34, and a clamp drive structure 2, 3, 4, 6, 8, 10, 28 for driving the tool clamping mechanism.

The clamp drive structure includes a cam follower device 10, 30, a cylindrically shaped movable member 28, a first cylindrically shaped cam 6, a second cylindrically shaped cam 8, and a gear device 2, 3, 4. The cam follower device consists of a pin 10, a ring-shaped block 30 for fixedly connecting the moveable member 8 with one end part of the pin 10, and a pair of rollers 24, 26 for surrounding the other end part of the pin 10. At the free end of the moveable member is fixedly attached the tool clamping mechanism 34.

The first cam 6 is rotatably mounted on a shaft 74 mounted on the frame. The second cam 8 is fixedly mounted on the frame. The gear device includes a drive gear 2 of a hydraulic motor, and a driven gear 4 for receiving the rotational motion of the drive gear 2 via an idle gear 3.

Figure 2:
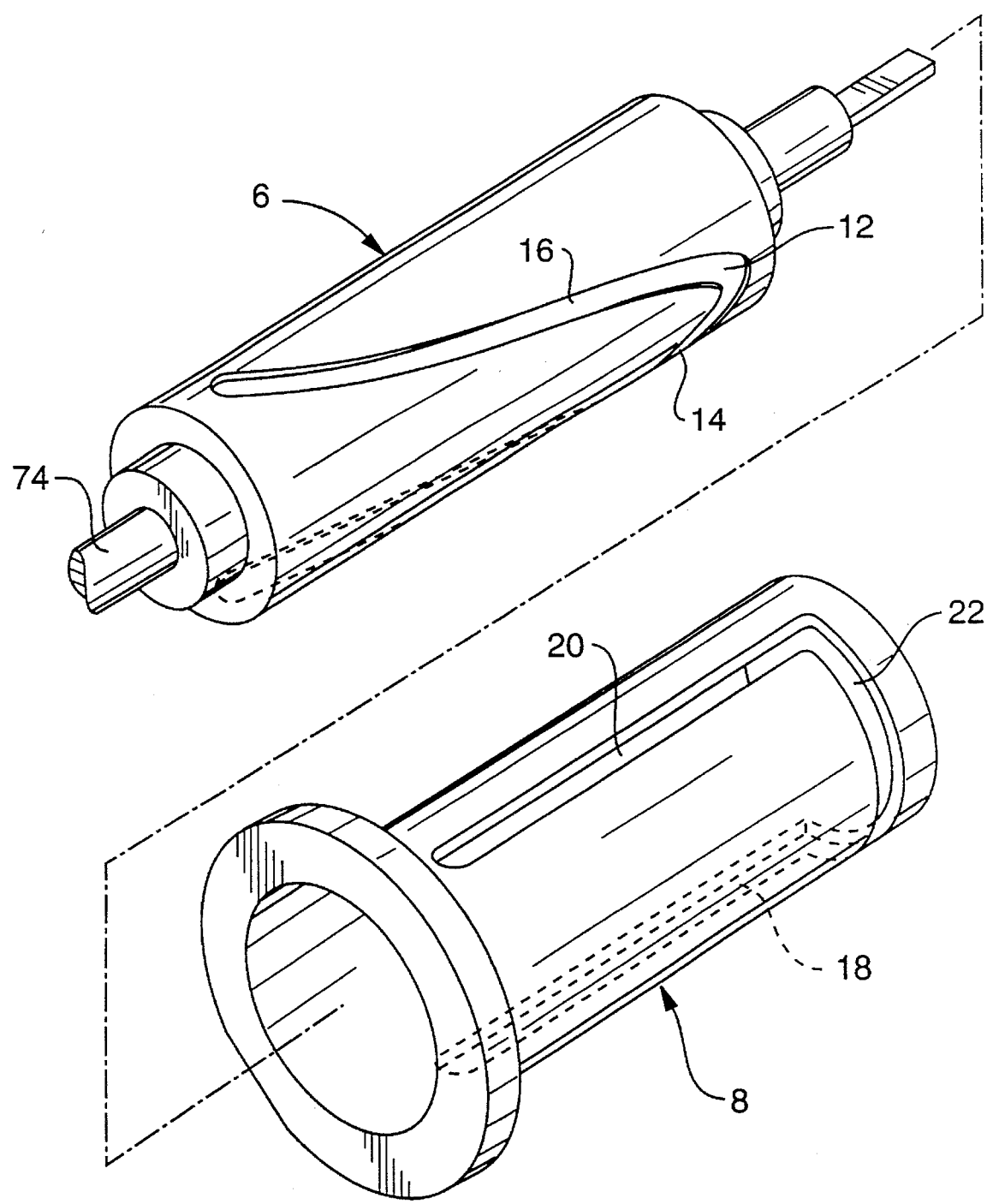
FIG. 2 is an exploded view of the cylindrical cams used in the tool change apparatus shown in FIG. 1.

As shown in FIG. 2, the first cam 6 has a drive cam groove 12, 14, 16 formed in its side surface to drive the cam follower device. The second cam 8 has a guide cam groove 18, 20, 22 formed in its side surface to guide the cam follower device. The first cam 6, second cam 8, and moveable member 28 are coaxially and snugly assembled together. Namely, the first cam 6 is snugly fitted into the second cam 8, which in turn is snugly fitted into the moveable member 28.

The drive cam groove consists of two oblique branches 14, 16, which are formed slantingly with respect to the direction of the shaft 40 and communicating at a connecting point 12 near the front end of the first cam 6 toward the direction of the tool clamping mechanism 34. In addition, the guide cam groove consists of two horizontal branches 18, 20, which are formed in parallel with the shaft 40 and connected with each other via a vertical branch 22 formed in the vertical direction with respect to the shaft 40. The vertical branch 22 meets with the connecting point 12 of the drive cam groove of the first cam 6. The vertical branch 22 has a length being half the circular perimeter of the second cam 8.

The drive and guide cam grooves are designed to cooperate to move the cam follower device and thus the moveable member 28 to a position for changing the tools when the first cam 6 is rotated by the gear device in a direction. When the first cam 6, second cam 8, and moveable member 28 are assembled together, the pin 10 of the cam follower device is inserted in the drive and guide cam grooves with the rollers 24 and 26 being respectively positioned in the drive and guide grooves so as to help the movement of the pin 10 in the grooves.

Figure 6:
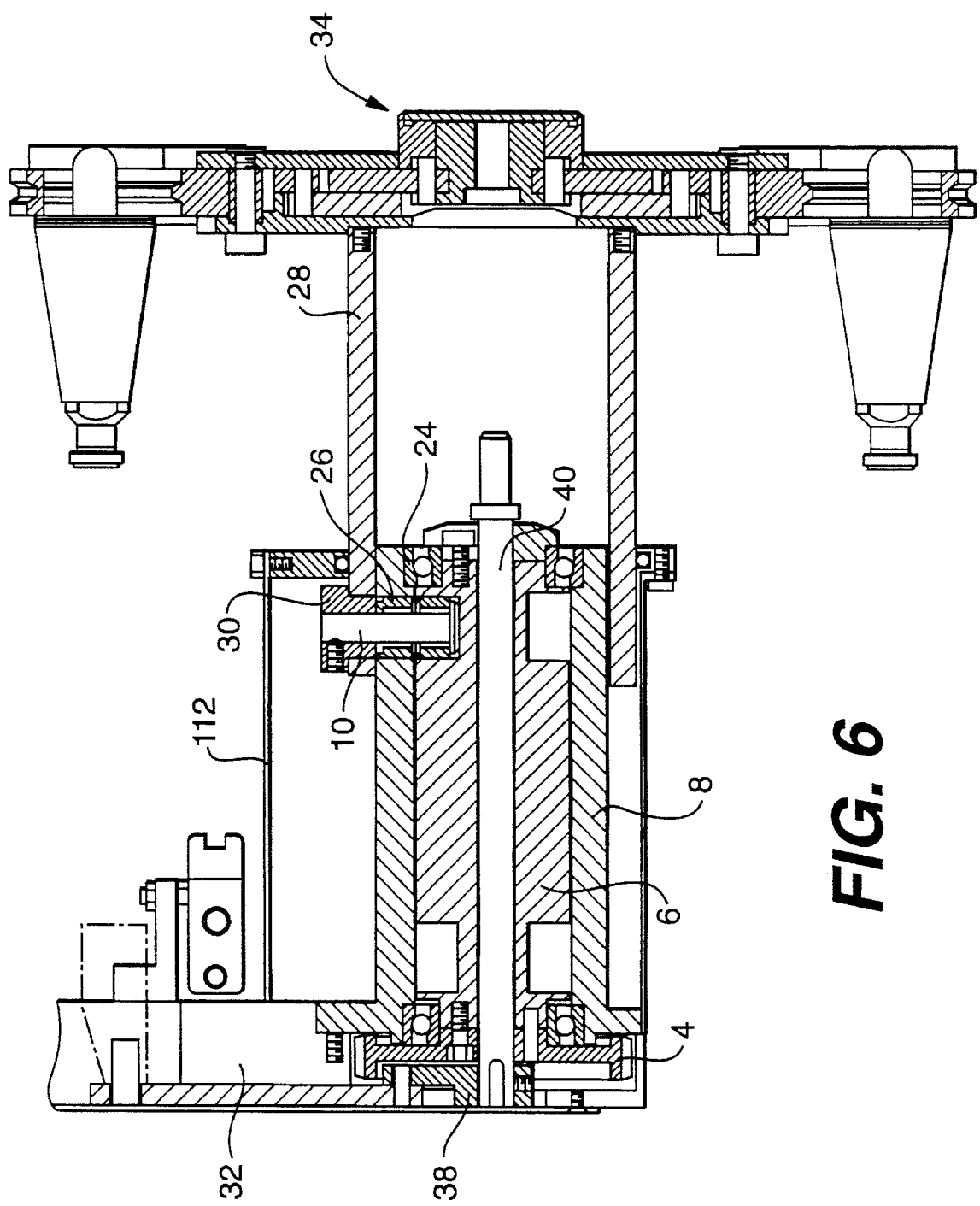
FIG. 6 shows an clamping state of the jaw depicted in FIG. 4.

When the driven gear 4 rotates the first cam 6 positioned as shown in FIG. 1, the pin 10 moves along the first oblique branch 14 of the first cam 6 toward the right side of the drawing. Accordingly, the moveable member 28 is moved together, as shown in FIG. 6, because the moveable member 28 is fixedly attached to the ring-shaped block 30 joined with the pin 10. In this case, the pin 10 is prevented from rotating until it reaches the vertical branch 22 of the second cam 8 which is fixedly mounted on the frame 32. Reaching the vertical branch 22 of the second cam 8 at the end of the first horizontal branch 18, the pin 10 is guided from the upper end to the lower end of the vertical branch 22, so that the moveable member 28 is rotated by 180° and thus the tool clamping mechanism 34 because the vertical branch 22 has a length being half the circular perimeter of the second cam 8. The pin 10 is kept at the connecting point 12 of the drive cam groove of the first cam 6 until reaching the lower end of the vertical branch 22 of the second cam 8.

Thereafter, as the drive gear 2 keeps on running, the pin 10 is driven backward by the second oblique groove 16 of the first cam 16, so that the moveable member 28 with the tool clamping mechanism 34 is moved to the initial position along the second horizontal branch 20 of the second cam 8.

Figure 4:
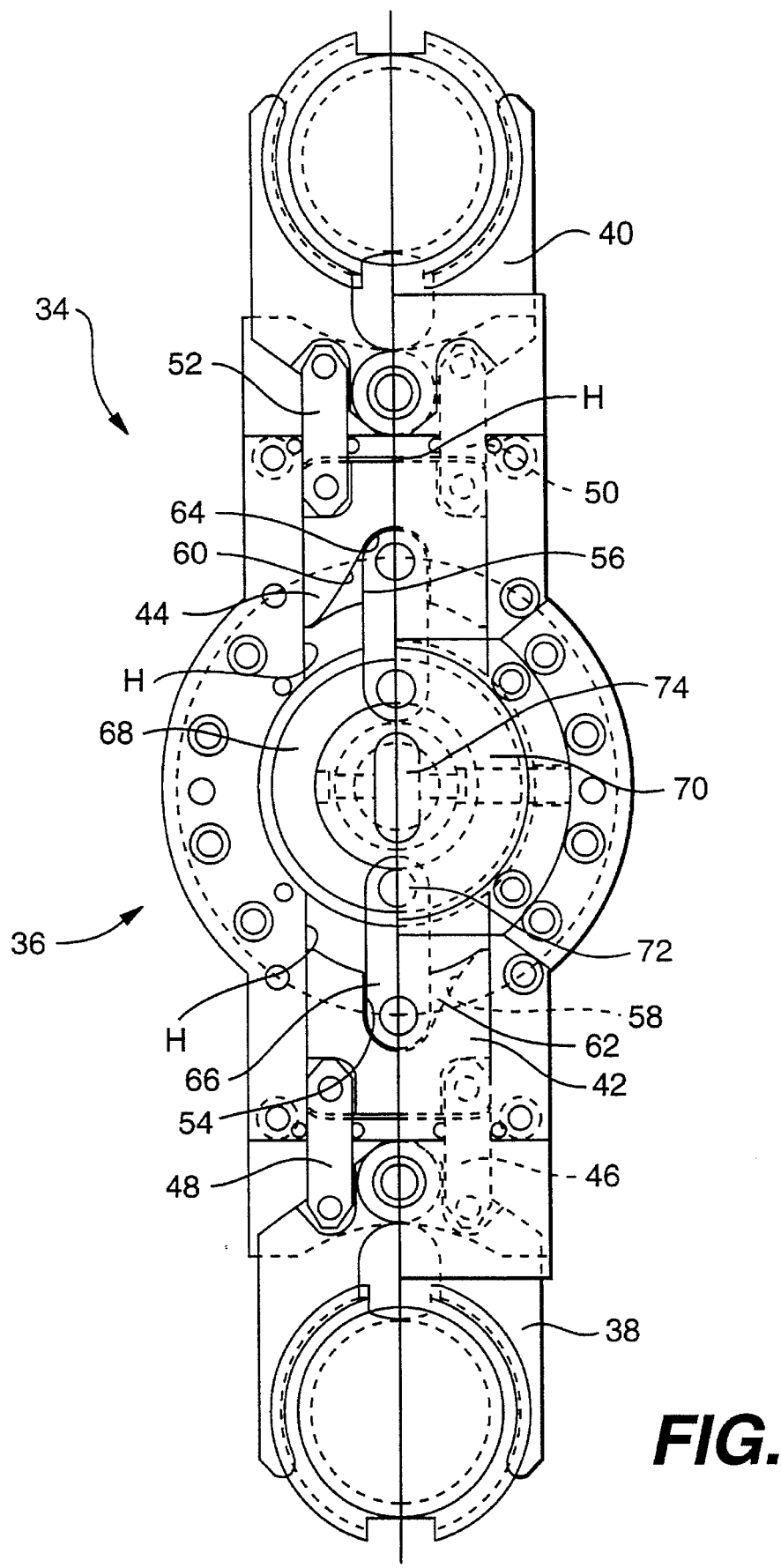
FIG. 4 is a front view of a tool clamping mechanism according to an embodiment of the present invention.
Figure 5A:
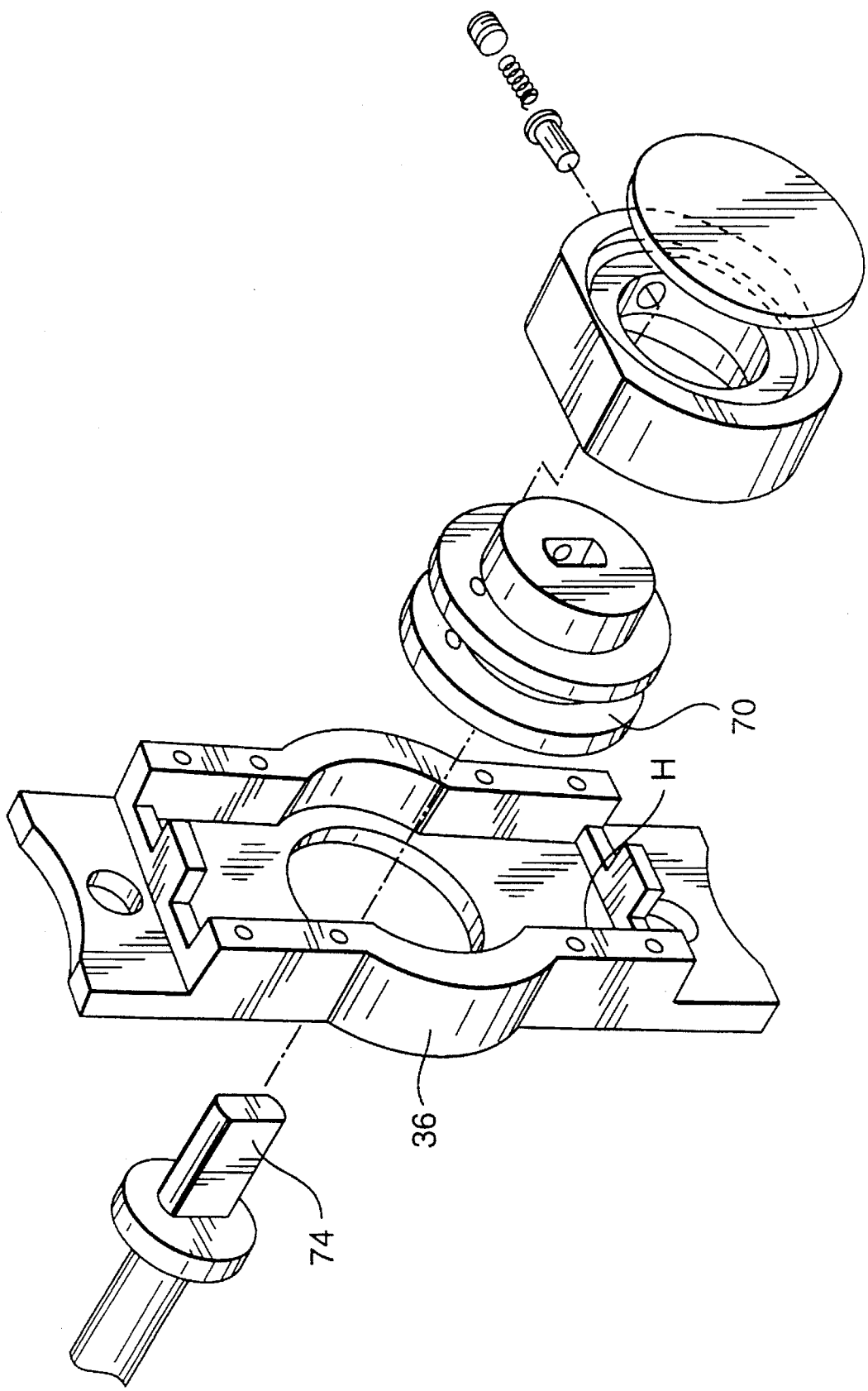
FIGS. 5A and 5B show an exploded view of the tool clamping mechanism as shown in FIG. 4.
Figure 5B:
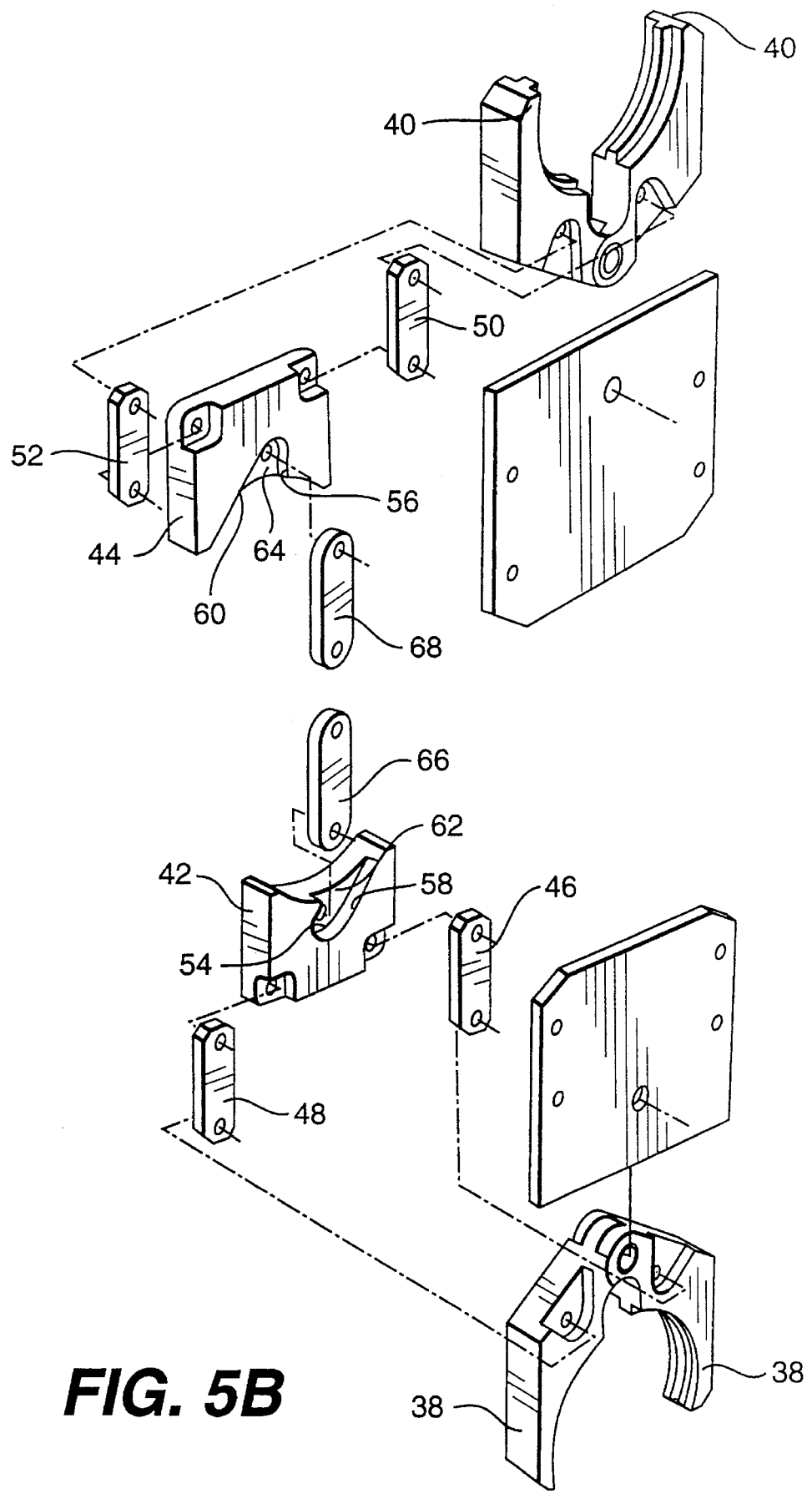

The tool clamping mechanism 34 includes, as shown in FIGS. 4 and 5, a pivoting member 36 fixedly mounted on the end of the moveable member 28, a pair of fingers 38 and 40 connected to opposite ends of the pivoting member, and a pair of sliders 42, 44 for respectively enabling the fingers to grasp or release a tool. The pivoting member 36 has a pair of guide channels H for respectively guiding the sliders 42 and 44, each of which is connected with the corresponding finger 38, 40 by means of a pair of links 46, 48, 50, 52.

A rotating block 70 is fixedly mounted on the free end of the shaft 74 on which the pivoting member 36 pivots. The sliders 42 and 44 each have a cut 62, 64 with a vertical surface 54, 56 and inclined surface 58, 60, where a link 66, 68 is provided to connect the rotating block 70 with the sliders 42, 44 by means of a pin 72. The rotating block 70 is designed to rotate with the shaft 74, of which the other end is connected with a swinging member 76, which in turn is connected with an actuating lever 78 by means of a pin. The actuating member 78 has the upper end connected with the upper end of a piston 82 mounted in the cylinder 80 by means of a pin 84, as shown in FIG. 3, so that the actuating member 78 may be raised or lowered according to the motion of the piston 82 in the cylinder 80.

Thus, as the piston 82 is lowered in the cylinder 80, the actuating member 78 pushes downward the swinging member 76 to rotate the shaft 74 and therefore the rotating block 70. Then, the link 66 pulls or pushes the sliders to open or close the fingers 38, 40 mounted on the opposite ends of the pivoting member 36. To this end, the pair of fingers 38 are pivotally connected by means of pins with each other and the links 46, 48. The piston 82 and actuating member 78 are connected with a block 86 by means of the pin 84.

The piston 82 is connected with a plate 88 of a tool pocket controller A, which has a slit 90 for receiving a pin 92 connected with the piston. In addition, the plate 88 has the lower end connected with a pusher 96 by means of a pin 94, which has a central portion pivotally connected with a block 100 by means of a pin 98. The pusher has on one side a groove 102 for holding a stopper 106 fixing the tool pocket 104. The block 100 is provided on one side with a resilient member 108 for maintaining the horizontal position of the pusher 96 receiving a pressure, and on the opposite side with a screwed pin 110.

The moveable member 28 is enclosed with a housing 112, whose one end is attached to the frame 32 and the other end to a side plate 114 in order to prevent foreign matter from being introduced into the guide cam groove of the second cam 8.

As shown in FIG. 4, when the rotating block 70 is positioned for the pin 72 to be in the vertical center line of the pivoting member 36, the links 66, 68 push the sliders 42, 44 outward as shown in FIG. 6, so that the pairs of links 46, 48 and 50, 52 are also pushed outward to close the fingers 38, 40 pivoted on a hinge. Thus, one pair of the fingers grasp a tool of a tool magazine, and the other pair the finished tool of a spindle head.

In this case, if the driven gear 4 is rotated, the moveable member 28 is moved forward and thus the tool clamping mechanism together with the pivoting member 36 until the pin 10 reaches the vertical branch 22 of the second cam 8. Then, as shown in FIG. 2, the pin 10 is guided from the upper end to the lower end of the vertical branch 22, so that the moveable member 28 is rotated by 180° and thus the tool clamping mechanism 34 because the vertical branch 22 has a length being half the circular perimeter of the second cam 8. Accordingly, the upper and the lower pair of fingers mutually change the position. Thereafter, the pin 10 is driven backward by the first oblique groove 14 of the first cam 6, so that the moveable member 28 with the tool clamping mechanism 34 is moved to the initial position along the second horizontal branch 20 of the second cam 8.

Finally, in order to change the tools grasped by the pair of fingers, the actuating member 78 is pushed downward by the piston 82 of the cylinder 80 to open the pairs of fingers of the tool clamping mechanism 34. Then, the swinging member 76 connected with the actuating member 78 swings by a given range to pivot the shaft 74 resulting in the rotation of the rotating block 70 from the position of FIG. 4, so that the links 66, 68 connected with the rotating block 70 pull inward the sliders 42, 44 and thus the pairs of links 46, 48 and 50, 52 to open the pairs of fingers.

What is claimed is:

1. A tool clamping mechanism for use in a machining center, comprising:

a pivoting member having at each of opposite ends a pair of fingers for grasping a tool, the fingers of each pair being connected to said pivoting member and each other by a hinge;

a block fixedly mounted on a rotatable shaft so as to be rotatable clockwise and counter-clockwise in a given range by said shaft, said block being rotatably positioned in the center of said pivoting member;

a pair of sliders for respectively pushing and pulling said pairs of fingers to open or close;

a pair of block links pivotably connected to said block and to said pair of sliders;

a pair of slider links pivotably connected to each of said sliders and each pair of fingers; and an actuating means for rotating said shaft and thus rotating the block, whereby when said block is rotated, said sliders are pulled or pushed so as to open or close said pairs of fingers through the cooperation of said links.

2. A tool clamping mechanism as defined in claim 1, wherein each of said sliders has a cut with a vertical surface and inclined surface for associating with each of said block links.

3. A tool clamping mechanism as defined in claim 1, wherein said pivoting member has a pair of guide channels for respectively guiding said pair of sliders.

* * * * *